United States Patent
Adelmann et al.

(10) Patent No.: US 6,326,709 B1
(45) Date of Patent: Dec. 4, 2001

(54) COOLING SYSTEM AND METHOD FOR COOLING A GENERATOR

(75) Inventors: Werner Adelmann; Kurt Becher, both of Mülheim; Uwe Eickelbeck, Velbert; Horst-Werner Emshoff, Mülheim; Rainer Fischer, Oberhausen; Christoph Lehmann, Neukirchen--Vluyn; Karl Spiegelhoff, Oberhausen, all of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/626,317

(22) Filed: Jul. 26, 2000

Related U.S. Application Data

(63) Continuation of application No. PCT/DE99/00043, filed on Jan. 13, 1999.

(30) Foreign Application Priority Data

Jan. 26, 1998 (DE) .............................. 198 02 801

(51) Int. Cl.[7] .............................. H02K 9/26; H02K 9/193
(52) U.S. Cl. .................................................. 310/52; 310/54
(58) Field of Search .................................. 310/52, 53, 54

(56) References Cited

U.S. PATENT DOCUMENTS

| | | | |
|---|---|---|---|
| 3,755,702 | * 8/1973 | Willyoung | 310/53 |
| 3,822,389 | * 7/1974 | Kudlacik | 310/53 |
| 3,835,919 | 9/1974 | Lambrecht et al. | 165/47 |
| 3,894,138 | * 7/1975 | Klaar | 310/53 |
| 4,016,442 | 4/1977 | Eggemann et al. | 310/59 |
| 4,766,557 | * 8/1988 | Twerdochlib | 364/550 |

FOREIGN PATENT DOCUMENTS

| | | |
|---|---|---|
| 2 222 487 | 11/1973 | (DE) . |
| 23 03 941 | 7/1974 | (DE) . |
| 30 27 362 A1 | 2/1982 | (DE) . |

OTHER PUBLICATIONS

Patent Abstracts of Japan No. 55–125053 (Hiroshi), dated Sep. 26, 1980.
Patent Abstracts of Japan No. 60–102838 (Taku), dated Jun. 7, 1985.
Patent Abstracts of Japan No. 59–106851 (Nobuo), dated Jun. 20, 1984.
"Rotor and Rotor Winding", Siemens Magazine, vol. 41, No. 10, 1967, pp. 838–839.
"Winding Test", AEG Telefunken Pocket Books, vol. 12, Berlin 1970, p. 47.
"Hydrogen–cooled synchronous generators with water–cooled stator winding", AEG–Telefunken Pocket Books, vol. 12, Berlin 1970, p. 53.

* cited by examiner

*Primary Examiner*—Karl Tamai
(74) *Attorney, Agent, or Firm*—Herbert L. Lerner; Laurence A. Greenberg; Werner H. Stemer

(57) ABSTRACT

The cooling system cools the stator and/or the rotor of a generator. A compensating container for compensating coolant is arranged in a parallel section that is connected in parallel with the cooling circuit. A calming section is additionally arranged in the cooling circuit for largely degassing the coolant.

20 Claims, 1 Drawing Sheet

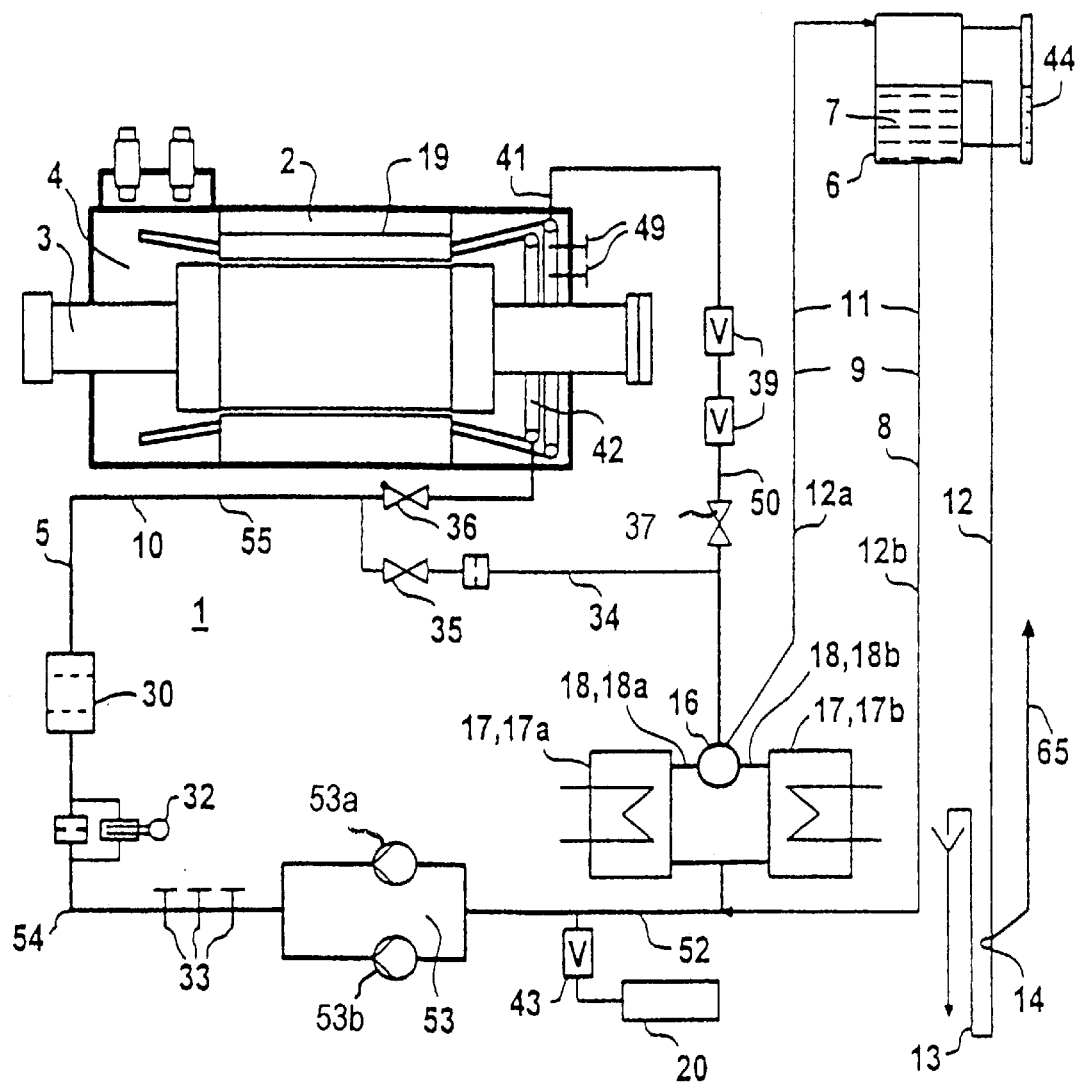

COOLING SYSTEM AND METHOD FOR COOLING A GENERATOR

CROSS-REFERENCE TO RELATED APPLICATION

This is a continuation of copending International Application PCT/DE99/00043, filed Jan. 13, 1999, which designated the United States.

BACKGROUND OF THE INVENTION

1. Field of the Invention

The invention relates to a cooling system for cooling the stator and/or the rotor of a generator, and to a method for cooling the stator and/or the rotor of a generator.

A hydrogen-cooled synchronous generator with a water-cooled stator winding is described in the book "Synchronmaschinen" [Synchronous Machines], AEG Telefunken Handbücher, Volume 12, Berlin 1970, on page 53. Generators with a water-cooled stator winding require a water loop. It comprises pumps for circulating the primary cooling water, return coolers and filters which ensure that the stator winding is not soiled, and an expansion vessel which is fitted on top on the machine. Fine filters and an ion exchanger for preparing the water are connected in the shunt circuit to this main circuit. Since the cooling water must be fed to the stator winding via insulating hoses, a small fraction of hydrogen can diffuse via them from the machine interior into the water circuit. This hydrogen fraction is given the opportunity of degassing from the water in the not entirely filled expansion vessel. It is led to the outside via a pressure control valve and a gas meter.

German patent application DE 22 22 487 describes a device for removing non-absorbed gases in liquids in the case of liquid-filled electric machines. In accordance with FIGS. 1 and 2 of that document, two concepts are applied for a cooling circuit. On the one hand, a coolant compensating container via which coolant is supplemented is connected to the cooling circuit via a spur line. In that compensating container which is disposed outside of the cooling circuit, a degassing container through which the entire coolant flow passes is connected into the cooling circuit. Outgassing of the coolant occurs in the degassing container. The gases are discharged to the outside. In accordance with the other concept, the compensating container for the coolant is integrated into a shunt circuit connected in parallel with the main cooling circuit. In this case, a smaller coolant flow of the shunt circuit passes continuously through the compensating container which serves simultaneously as a degassing container.

A cooling water circuit for a water-cooled electric machine is described with the aid of FIG. 5 in Siemens-Zeitschrift [Siemens Journal], Vol. 41, 1967, issue 10, pages 838–39. The cooling water must have a low electric conductivity for reasons of insulation. For this reason, chemical filters or ion exchangers, which continuously reduce the ion concentration in the cooling water, are connected into the cooling circuit.

SUMMARY OF THE INVENTION

The object of the invention is to provide a cooling system and a method of cooling a generator, i.e., the stator and/or the rotor of the generator, which overcomes the above-noted deficiencies and disadvantages of the prior art devices and methods of this kind, and which is simple and cost-effective.

With the above and other objects in view there is provided, in accordance with the invention, a cooling system for cooling a generator, comprising:

a cooling circuit;

a compensating container for a coolant in said cooling circuit arranged outside said cooling circuit in a parallel section connected in parallel with said cooling circuit and communicating with said cooling circuit;

a cooler with a coolant inlet integrated in said cooling circuit; and a calming section connected upstream of said coolant inlet in a coolant flow direction for degassing and calming the coolant.

In other words, the novel system for cooling the stator and/or the rotor of a generator has a cooling circuit and a compensating container for a coolant flowing through the cooling circuit. The compensating container is arranged outside the cooling circuit and is connected to the cooling circuit by a line, whereby the compensating container is integrated into a parallel section connected in parallel with the cooling circuit. There is provided in the cooling circuit a calming section which serves for degassing and calming the coolant.

As set forth above, in the case of water-cooled generators a compensating container has frequently been arranged such that the entire coolant flows through it. This requires a compensating container of very large dimensions. Such a compensating container is a substantial cost factor. In the case of the present design, the compensating container is removed from the cooling circuit and integrated into a parallel section with respect to the cooling circuit. As a result, coolant flowing in the parallel section flows continuously through the compensating container. This affords the advantage, in particular, that the coolant in the compensating container does not stagnate. Stagnation of the coolant makes the latter more conductive with time, which can lead to insulation problems. With continuous through-flow, insulation problems that can be caused by stagnation are avoided.

The invention is based on the finding that, in the case of a parallel connection of the compensating container, the coolant is degassed only incompletely, since only a small part of the coolant flows through the compensating container and can be degassed there. In order to ensure extensive degassing, a calming section is arranged in the cooling circuit. Such a calming section may be e.g. simply a line connected in parallel with the cooling circuit. In such a calming section, the coolant flows more slowly and can degas. The parallel section in which the compensating container is arranged preferably branches off from said calming section. The main stream of the coolant flows through the latter, thereby achieving effective degassing of the coolant.

The compensating container preferably holds between 50 and 800 l (liter), in particular between 100 and 300 l. It is also preferably possible to guide a primary coolant flow through the cooling circuit and to guide a secondary coolant flow through the parallel section, the primary coolant flow being larger by a factor of 10 to 100, in particular by a factor of 50 to 200, than the secondary coolant flow. The primary coolant flow is preferably between 10 and 100 m³/h, in particular between 20 and 40 m³/h. The secondary coolant flow is preferably between 10 and 500 l/h, in particular between 100 and 250 l/h.

The compensating container is preferably connected to a discharge line which serves to discharge surplus coolant from the cooling circuit. It is thereby possible for surplus coolant to be discharged simply via a discharge line, whereas previously there was a need to provide an overpressure valve.

It is further preferred for the discharge line to have a U-shaped bend in the region of which a gas outlet opening is arranged such that upon overshooting of a limiting gas pressure in the compensating container gas can be discharged from the compensating container via the gas outlet opening. An overpressure valve can thereby be eliminated. The coolant level can preferably be monitored via a sight glass.

In accordance with an additional feature of the invention, the compensating container is positioned separately from the generator. The compensating container therefore does not form a structural unit with the generator. Such an embodiment is possible owing to the compensating container of smaller dimensions which is arranged outside the cooling circuit. In particular, this results in the advantage that the compensating container does not have to be provided with any expensive vibration damping. Such vibration damping is required when, as previously, the compensating container forms a structural unit with the generator, that is to say, for example, is arranged on the generator. The compensating container is thereby exposed to the vibrations which are caused by the generator during operation.

In accordance with again an additional feature of the invention, there is integrated a cooler with a coolant inlet in the cooling circuit, the calming section being connected upstream of the coolant inlet. It is preferred to provide two coolers whose coolant inlets are connected by means of the calming section. This configuration exhibits a particularly suitable arrangement of the calming section.

In accordance with again another feature of the invention, oxidation-resistant cooling channels for the coolant are provided in the stator. The following advantages can be achieved by means of such oxidation-resistant cooling channels, for example cooling channels made from high-grade steel:

The limits of the oxygen content of the coolant can be generously dimensioned.

It is possible to dispense with nitrogen purging for the purpose of minimizing the oxygen content in the coolant.

The level of the pH value is of subordinate importance.

An ion exchanger can be eliminated.

The substantial outlay on time for the purpose of conditioning the water during commissioning of the generator is eliminated.

In accordance with a preferable feature of the invention, there are provided means for supplying coolant for refreshing, i.e., resupplying the coolant flowing through the cooling circuit. Such refreshing serves to replace the coolant which becomes enriched with ions over time by new coolant of low conductivity. Such low conductivity is sought for good insulation. In particular in the case of oxidation-resistant channels of the cooling system in the stator or in the rotor, new coolant can be fed to the cooling circuit in a simple manner since, in contrast to cooling channels made of copper, for example, there is no need to observe a rigorously closed cooling circuit.

The cooling system is preferably used for cooling the stator of a water-cooled turbo-driven generator, in particular a turbo-driven generator with a power of between 500 and 1300 MVA.

With the above and other objects in view there is also provided, in accordance with the invention, a method of cooling a stator of a generator. The method comprises the following method steps:

conducting coolant through a stator winding of a generator and through a cooler;

maintaining a quantity of coolant substantially constant with a coolant reservoir, without conducting the entire quantity of coolant through the reservoir; and degassing and calming the coolant in a calming section connected upstream of the cooler in a coolant flow direction.

Other features which are considered as characteristic for the invention are set forth in the appended claims.

Although the invention is illustrated and described herein as embodied in a cooling system and a method for cooling a generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE is a diagrammatic illustration of a cooling system for the stator of a generator.

DESCRIPTION OF THE PREFERRED EMBODIMENTS

Referring now to the FIGURE in detail, there is illustrated a cooling system 1 for a turbo-driven generator 4. It is understood that the FIGURE is not drawn to scale. The turbo-driven generator 4 comprises a rotor 3 and a stator 2 surrounding the rotor 3. The stator 2 has an electric winding with a multiplicity of electric conductors. Cooling channels 19 made from high-grade steel and of which one cooling channel 19 is indicated diagrammatically lead through the electric winding. The cooling channels 19 are integrated into a cooling circuit 5. A coolant 7, here water, flows in the cooling circuit 5. The cooling channels 19 are connected to a hot water manifold 41. A line 50 leads from the hot water manifold 41 to two parallel-connected coolers 17 (17*a*, 17*b*). A volumetric flow measuring instrument 39 is integrated into the line 50. The temperature in the hot water manifold 41 is determined via a temperature sensor or temperature measuring instrument 49. The first cooler 17*a* has a coolant inlet 18*a*.

The second cooler 17*b* has a coolant inlet 18*b*. The coolant inlets 18*a* and 18*b* are connected in parallel to a calming section 16. A line 52 leads from the coolers 17*a* and 17*b* to a pump unit 53. A refreshing unit 20, i.e., a fresh coolant supply, which can be switched in and out of the coolant loop by a valve 43 opens into the line 52. A line 54 leads to a filter 30 from the pump unit 53. The filter 30 serves to filter out dirt particles. Furthermore, a conductivity measuring instrument 32 and a temperature measuring instrument 33 are built into the line 54. A line 55 leads from the filter 30 to a cold water manifold 42. The cold water manifold 42 is connected, in turn, to the cooling channels 19.

A line 12*a* which leads to a compensating container 6 branches off from the calming section 16. A line 12*b* leads from the compensating container 6 to the line 52 hydrodynamically downstream of the coolers 17 (i.e., in the flow direction). A discharge line 12 leads away from the compensating container 6. The discharge line has a U-shaped bend 13. Gas can be discharged in the region of the U-shaped bend 13 via a gas outlet opening 14 when its gas pressure is so high in the compensating container 6 that coolant 7 is pressed below the gas outlet opening 14. Furthermore, a filling level display 44 is provided on the compensating container 6.

The cooling circuit 5 for cooling the stator 2 is formed by
a the cooling channels 19 in the stator 2,
a the hot water manifold 41,
the line 50,
the calming section 16 and the coolers 17,
the line 52,
the line 54,
the line 55, and
the cold water manifold 42.

The cooling circuit 5 also comprises the measuring and operating units integrated into it, for example the pump unit 53 or the filter 30.

There is further provided a bypass line 34 in parallel with the generator 4. It can be switched in or out via a valve 35. A valve 36 closes or opens the line 55 to the generator 4. The bypass line serves, inter alia, to protect the pump unit 53 when the cooling system 1 is being started up.

The cooling circuit 5 is connected in parallel with a parallel section 9 which comprises
the line 12a,
the compensating container 6, and
the line 12b.

An important advantage of the cooling system 1 is that the compensating container 6 is arranged outside the cooling circuit 5. Only a relatively small secondary coolant flow 11 is led through the compensating container 6 via the parallel section 9. The compensating container 6 can thereby be of relatively small design. The compensating container 6 preferably holds between 50 and 800 l, in particular between 100 and 300 l. The secondary coolant flow 11 is smaller in this case by a factor of 50 to 200, for example, than a primary coolant flow 10 which is led in the cooling circuit 5. The small configuration of the compensating container 6 is particularly cost-effective. In addition, the compensating container 6 does not form a structural unit with the generator 4. Consequently, firstly it can be designed without vibration damping, and secondly it can be set up at any desired, particularly suitable site.

A further advantage of the cooling system 1 resides in the fact that a calming section 16 is connected upstream of the coolers 17. The water flows more slowly and can be degassed in this calming section 16. The gas is fed via the line 12a to the compensating container 6. It can be let out of the latter in a simple fashion via the cover, for example. An overpressure valve for the compensating container 6 is further eliminated. The overpressure equalization is performed via the discharge line 12.

The cooling system 1 shown can be used, in particular, for generators with oxidation-resistant cooling channels 19.

The individual components are described in more detail in the following.

Piping of the Generator:

Cold water is fed to the generator via an ultrafine filter at the generator inlet, and is fed into the cold water manifold 42 at the bottom in the vertical middle. The hot water heated by the generator 4 is extracted from the hot water manifold 41 at the top in the vertical middle and led downwards outside the generator 4 to the coolers 17. This incorporation ensures the automatic ventilation of manifolds and starts during operation. Shut-off valves 36, 37 are disposed inline in the supply line immediately upstream of the generator and in the return line. The valves permit a flushing operation via the bypass line 34 without the cooling channels 19 running full of water in the process or being undesirably wetted. The volumetric flow in the bypass line 34 is restricted to the nominal volumetric flow of the pump unit 53 by suitable measures.

Pumps:

Two centrifugal pumps 53a, 53b of identical power are available for circulating the water circuit. Each pump 53a, 53b can be selected as an operating pump or standby pump. The standby pump is automatically switched in as soon as the operating pump fails. Three-phase AC motors which are fed from different networks are provided for driving the pumps 53a, 53b.

Filters:

The water filled in and circulated must be largely free from suspended matter which can be deposited and build up flow impediments. The water of the primary coolant flow 10 must therefore be led to the filter 30 with a suitable filter grade. There is no need for bypassing. The degree of soiling can be detected via a pressure difference measurement. A pressure difference meter with a binary limit monitor is provided as standard.

Coolers:

The coolers 17 serve for return cooling of the primary water flow 10. Provided as standard are two coolers 17a, 17b. Each cooler 17a, 17b assumes 50% of the cooling power. Soldered plate coolers are used as the coolers 17. All wetted surfaces consist of stainless steel. No bypass is provided on the primary water side for the coolers 17. Consequently, a cooler 17 takes over the full primary water volumetric flow in the case of malfunction. The fall in the volumetric flow effected by the rise in the pressure difference does not initiate protection in this case. Located on the primary-side coolant inlets 18a, 18b of the coolers 17 is a parallel switching pipe, the calming section 16, which serves as a bubble separator. It ensures that the flow is calmed and that gas bubbles can be eliminated. The cross section of the calming section 16 is dimensioned for this additional task. A small cooler bypass quantity flows steadily to the compensating container 6 via the line 12a. This secondary coolant flow is used to carry eliminated bubbles out of the calming section 16 into the compensating container 6.

Compensating Container:

The compensating container 6 is connected to the cooling circuit 5 via spur lines 12a, 12b. It absorbs the thermally conditioned volumetric change in the water, discharges surplus water and serves as ventilating and degassing tank. When the cooling channels 19 are being filled up during commissioning, it temporarily covers the additionally required water demand. There is a low forced volumetric flow through the compensating container 6. This volumetric flow carries gas bubbles of the cooling circuit 5 into the compensating container 6. The filling level of the compensating container 6 can be detected from outside, and the undershooting of the minimum filling level is notified by a warning. The dewatering and degassing are combined via a water supply such that water can flow without pressure, whereas in the case of overpressure in the compensating container 6 gas is discharged into an exhaust line 65. The water supply is continuously renewed via the water of the refreshing unit 20. There is no need for maintenance and monitoring of the water filling. Hydrogen penetrates into the water by diffusion and mini-leakages in the case of a hydrogen-cooled generator. There builds up in the compensating container 6 an overpressure which presses the water column in the pressure limb of the U-shaped bend as far as the level of the gas outlet opening 14 for the exhaust line 65. Hydrogen which has further penetrated is led via the discharge line 12 into the exhaust line 65, and does not cause any additional rise in pressure. A nitrogen rise at the bubble separator, the calming section, renders it possible to flush the compensating container 6 with inert gas.

Coolant Feed:

The water fed in for the purpose of refreshment is extracted from a deionized water network of low conductivity. The water is fed in upstream of the pumps 53a, 53b and led via a fine filter before being fed in. The volumetric flow is set by hand using a control valve and displayed locally. A return-flow lock or check valve prevents loss of primary water when the deionizing water network is unpressurized.

We claim:

1. A cooling system for cooling a generator, comprising:
    a cooling circuit;
    a compensating container for a coolant in said cooling circuit arranged outside said cooling circuit in a parallel section connected in parallel with said cooling circuit and communicating with said cooling circuit;
    a cooler with a coolant inlet integrated in said cooling circuit; and
    a calming section connected upstream of said coolant inlet in a coolant flow direction for degassing and calming the coolant.

2. The cooling system according to claim 1, wherein said compensating container has a volume of between 50 and 800 liters.

3. The cooling system according to claim 1, wherein said compensating container has a volume of between 100 and 300 liters.

4. The cooling system according to claim 2, wherein said cooling circuit contains a primary coolant flow and said parallel section contains a secondary coolant flow, and wherein said primary coolant flow is larger than said secondary coolant flow by a factor of 10 to 1000.

5. The cooling system according to claim 2, wherein said primary coolant flow is larger than said secondary coolant flow by a factor of 50 to 200.

6. The cooling system according to claim 4, wherein said primary coolant flow is between 10 and 100 m$^3$/h.

7. The cooling system according to claim 4, wherein said primary coolant flow is between 20 and 40 m$^3$/h.

8. The cooling system according to claim 4, wherein said secondary coolant flow is between 10 and 500 l/h.

9. The cooling system according to claim 4, wherein said secondary coolant flow is between 100 and 250 l/h.

10. The cooling system according to claim 1, which comprises a discharge line communicating with said compensating container for discharging surplus coolant from said cooling circuit.

11. The cooling system according to claim 10, wherein said discharge line has a U-shaped bend formed with a gas outlet opening, whereby when a limit gas pressure in said compensating container is exceeded, gas is discharged from said compensating container via said gas outlet opening.

12. The cooling system according to claim 1, wherein said compensating container is positioned separately and distally from the generator.

13. The cooling system according to claim 1, which comprises a cooling device with a coolant inlet integrated in said cooling circuit, wherein said calming section is connected upstream of said coolant inlet in the coolant flow direction.

14. The cooling system according to claim 13, wherein said calming section is connected immediately upstream of said coolant inlet.

15. The cooling system according to claim 13, wherein said cooling device comprises two coolers having coolant inlets connected by said calming section.

16. The cooling system according to claim 1, wherein said coolant loop comprises oxidation-resistant channels disposed in a stator of the generator.

17. The cooling system according to claim 1, which further comprises a source of fresh coolant communicating with said cooling circuit for feeding fresh coolant into said cooling circuit.

18. The cooling system according to claim 1, wherein the generator is a water-cooled turbo-driven generator with a stator and said cooling loop is connected for cooling the stator of the generator.

19. The cooling system according to claim 18, wherein the generator is a turbo-driven generator with a power of between 500 and 1300 MVA.

20. A method of cooling a stator of a generator, which comprises:
    conducting coolant through a stator winding of a generator and through a cooler;
    maintaining a quantity of coolant substantially constant with a coolant reservoir, without conducting the entire quantity of coolant through the reservoir; and
    degassing and calming the coolant in a calming section connected upstream of the cooler in a coolant flow direction.

\* \* \* \* \*